(12) United States Patent
Wang et al.

(10) Patent No.: US 10,140,480 B2
(45) Date of Patent: Nov. 27, 2018

(54) ELECTRONIC COUNTER FOR FLUID FLOW TOOLS

(71) Applicant: Apex Brands, Inc., Apex, NC (US)

(72) Inventors: Yen-Chien Wang, Woodinville, WA (US); Lincoln Coleman Wilkes, Kenmore, WA (US); Kevin William Myhill, Lexington, SC (US)

(73) Assignee: APEX BRANDS, INC., Apex, NC (US)

( * ) Notice: Subject to any disclaimer, the term of this patent is extended or adjusted under 35 U.S.C. 154(b) by 0 days.

(21) Appl. No.: 15/514,844

(22) PCT Filed: Oct. 5, 2015

(86) PCT No.: PCT/US2015/053954
§ 371 (c)(1),
(2) Date: Mar. 28, 2017

(87) PCT Pub. No.: WO2016/057375
PCT Pub. Date: Apr. 14, 2016

(65) Prior Publication Data
US 2017/0220825 A1    Aug. 3, 2017

Related U.S. Application Data

(60) Provisional application No. 62/060,258, filed on Oct. 6, 2014.

(51) Int. Cl.
*G06K 19/00* (2006.01)
*G06K 7/02* (2006.01)
(Continued)

(52) U.S. Cl.
CPC ............ *G06K 7/02* (2013.01); *F16K 37/0033* (2013.01); *G01F 1/38* (2013.01); *G01F 1/684* (2013.01)

(58) Field of Classification Search
USPC .......................... 235/435, 439, 452
See application file for complete search history.

(56) References Cited

U.S. PATENT DOCUMENTS

| 5,792,967 A | 8/1998 | Steber et al. |
| 6,914,531 B1 * | 7/2005 | Young .................... A62C 35/68 |
| | | 340/606 |

(Continued)

FOREIGN PATENT DOCUMENTS

| CN | 102099608 A | 6/2011 |
| EP | 1691174 A2 | 8/2006 |
| WO | 2002102554 A1 | 12/2002 |

OTHER PUBLICATIONS

CN Search Report dated Jan. 17, 2018 in re CN Application No. 201580066333.7 filed Jun. 6, 2017.

*Primary Examiner* — Matthew Mikels
(74) *Attorney, Agent, or Firm* — Coats & Bennett, PLLC

(57) ABSTRACT

A counter to monitor an amount of tool use that includes a fluid passage (23) with an inlet (21) and an outlet (22). A piston (30) and sensor target (50) (e.g., magnet) are positioned along the passage and are biased towards a first position by a biasing member (40). When the tool is not in operation, the piston and sensor target are located at a first position due to the biasing force. When the tool is in operation, fluid moves along the fluid passage. A force applied by the moving fluid on the piston and sensor target overcomes the force applied by the biasing member and moves the piston and sensor target along the fluid passage to a second position. A sensor is configured to sense the sensor target at the second position. A processing circuit (62) determines the tool usage based on the detection of the sensor target at the second position by the sensor.

13 Claims, 6 Drawing Sheets

(51) Int. Cl.
*G01F 1/38* (2006.01)
*G01F 1/684* (2006.01)
*F16K 37/00* (2006.01)

(56) References Cited

U.S. PATENT DOCUMENTS

| | | |
|---|---|---|
| 8,271,141 B2 | 9/2012 | Cummings et al. |
| 2008/0011076 A1 | 1/2008 | Buck et al. |
| 2011/0062356 A1 | 3/2011 | Pogel et al. |

* cited by examiner

ELECTRONIC COUNTER FOR FLUID FLOW TOOLS

RELATED APPLICATIONS

The present application claims the benefit of U.S. Provisional Application No. 62/060,258, filed on Oct. 6, 2014 and entitled "Electronic Counter for Pneumatic Tools," the disclosure of which is hereby incorporated by reference in its entirety.

BACKGROUND

Many tools are powered by fluid, such as compressed air or hydraulic fluid. These tools are popular because they are generally safer to use than electric powered tools. These tools may also have a higher power-to-weight ratio making them smaller and lighter thereby facilitating their use. Types of fluid flow tools include but are not limited to screwdrivers, wrenches, ratchets, impact wrenches/drivers, drills, sanders, grinders, and nail guns.

Tools are generally constructed to operate for a predetermined amount of use. This may include a predetermined number of operation cycles, or a predetermined amount of operational time. After operating through this amount of use, the tools may need to have maintenance to make certain they continue to operate adequately. Worn parts may need to be replaced and/or calibrations may be necessary to ensure the tool is operating adequately. In some situations, the tool may no longer be reliably operational and may need to be replaced.

Thus, it is necessary to monitor tool usage. Some existing tools require usage measurements to be performed through a manual process, such as using punch cards. This is a tedious process and prone to errors. Other methods and devices have been used, but with inconsistent results.

SUMMARY

The present application is directed to a counter for in monitoring operational use of a tool. One embodiment is directed to a counter for a fluid-powered tool that includes fluid that moves along a fluid line when the tool is in operation. The counter includes a body with a fluid passage having an inlet and an outlet and configured for the fluid to move through the passage from the inlet to the outlet when the tool is in operation. A piston with a first end faces towards the outlet and a second end that faces towards the inlet. The piston is positioned within the passage between the inlet and the outlet and includes a smaller cross-sectional size than the passage to be movable along the passage. A sensor target (e.g., a magnet) is attached to the piston and is positioned within the passage. The sensor target is sized to be movable along the passage with the piston. A sensor is configured to detect when the sensor target is within a predetermined range along the passage. A biasing member applies a first force to the piston to bias the sensor target away from the predetermined range. A processing circuit is configured to monitor when the sensor detects the sensor target. The first force of the biasing member positions the sensor target away from the predetermined range when the tool is not in operation. The first force is less than a force applied by the fluid moving along the fluid line when the tool is in operation with the sensor target being positioned in the predetermined range.

The processing circuit may be configured to count a number of times that the sensor detects the sensor target within the predetermined range to determine a usage of the tool based on the count.

The processing circuit may be configured to monitor an amount of time that the sensor target is within the predetermined range of the sensor to determine a usage of the tool based on the amount of time.

The biasing member may be positioned within the passage.

A stop may be positioned along the passage between the inlet and the predetermined range of the sensor. The stop may extend into the passage to limit an extent of movement of the piston upstream from the predetermined range.

The biasing member may bias the piston in a direction upstream from the predetermined range of the sensor.

The sensor target may be a magnet, or other type proximity sensor target.

The sensor target may be a magnet, and the piston may be non-magnetic and may include a greater length measured along the passage than the sensor target.

Another embodiment is directed to counter for a fluid-powered tool that includes fluid that moves along a fluid line when the tool is in operation. The counter includes a fluid passage with an inlet and an outlet and is configured for the fluid to move through the passage from the inlet to the outlet when the tool is in operation. A piston and sensor target are positioned within the passage between the inlet and the outlet. The piston and sensor target are sized to be movable along the passage with the sensor target positionable along the passage between an upstream first position and a downstream second position. A biasing member applies a force to the piston and sensor target to bias the piston and sensor target towards the first position. A sensor detects the sensor target when the sensor target is in the second position. A processing circuit is configured to monitor when the sensor detects the sensor target in the second position to determine a tool usage.

The passage may be straight.

A stop may extend into the passage to contact the piston and sensor target at the first position and prevent the piston and sensor target from moving upstream from the stop.

The piston and sensor target may include a front face that faces in an upstream direction and that is contacted by the fluid when the tool is in operation.

Each of the piston and sensor target and the passage may include circular cross-sectional shapes with the cross-sectional shape of the piston and sensor target being smaller than the passage.

The processing circuit may be configured to count a number of times that the sensor detects the sensor target at the second position to determine the tool usage based on the count.

The processing circuit may be configured to monitor an amount of time that the sensor detects the sensor target at the second position to determine a usage of the tool based on the amount of time.

The sensor target may be a magnet, or other type proximity sensor target.

Another embodiment is directed to a method of monitoring usage of a tool with a counter. The method includes applying a biasing force to a piston that is within a fluid line in the tool and positioning the piston at a first position with a sensor target that is operatively connected to the piston away from detection of a sensor. The method includes operating the tool and moving fluid through the passage and applying a force to the piston through the fluid that overcomes the biasing force and moves the piston downstream along the fluid line to a second position. The method includes detecting the sensor target with the sensor while the piston is at the second position. The method includes determining the usage of the tool based on the sensor detecting the sensor target at the second position.

Determining the usage of the tool may include determining an amount of time that the sensor target is detected by the sensor.

Determining the usage of the tool may include counting a number of times that the sensor target is detected by the sensor.

The method may include positioning that the piston in the first position while the fluid is not moving through the passage and the tool is not in use.

The sensor target may be a magnet, or other type proximity sensor target.

The sensor target may be a magnet, and the method may include moving the sensor target within the passage.

The method may include biasing the piston to a point upstream from the sensor when the fluid is not moving through the passage.

The various aspects of the various embodiments may be used alone or in any combination, as is desired.

DETAILED DESCRIPTION

The present application is directed to a counter to monitor an amount of tool use. The counter is positioned along a fluid line of the tool and may be a replacement part for retrofitting to an existing tool or as factory-installed feature. The counter includes a fluid passage that includes an inlet and an outlet. A piston with a sensor target (e.g., magnet) are positioned along the passage and are biased towards a first position by a biasing member. When the tool is not in operation, the piston and sensor target are located at a first position due to a biasing force. When the tool is in operation, fluid moves along the fluid passage. A force applied by the moving fluid on the piston and sensor target overcomes the force applied by the biasing member. The piston and sensor target move along the fluid passage to a second position. A sensor is configured to sense the sensor target at the second position via non-contact proximity sensing. A processing circuit determines the tool usage based on the detection of the sensor target by the sensor.

The counter is configured to work with various different fluids that are used to power tools. Fluids may include but are not limited to air or other compressed gas(es) for pneumatic-powered tools and liquid for hydraulic-powered tools.

Figure 1:
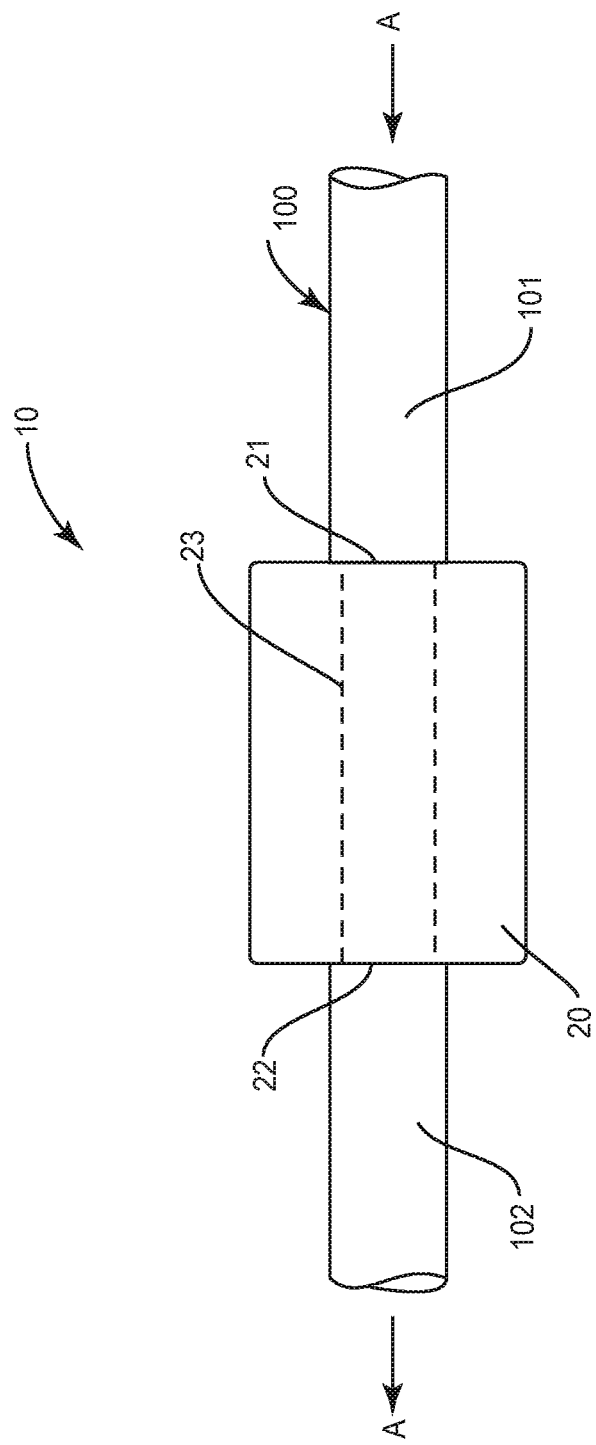
FIG. 1 is a side view of a counter positioned along a fluid line.

FIG. 1 illustrates a counter 10 positioned along a fluid line 100 in a tool. The counter 10 includes a body 20 with a passage 23 that extends between an inlet 21 and an outlet 22. The inlet 21 is configured to attach to a first section 101 of the fluid line 100 and the outlet 22 to a second section 102 of the fluid line 100. Fluid moves along the fluid line 100 and through the counter 10 in the direction indicated by arrows A.

Figure 2:
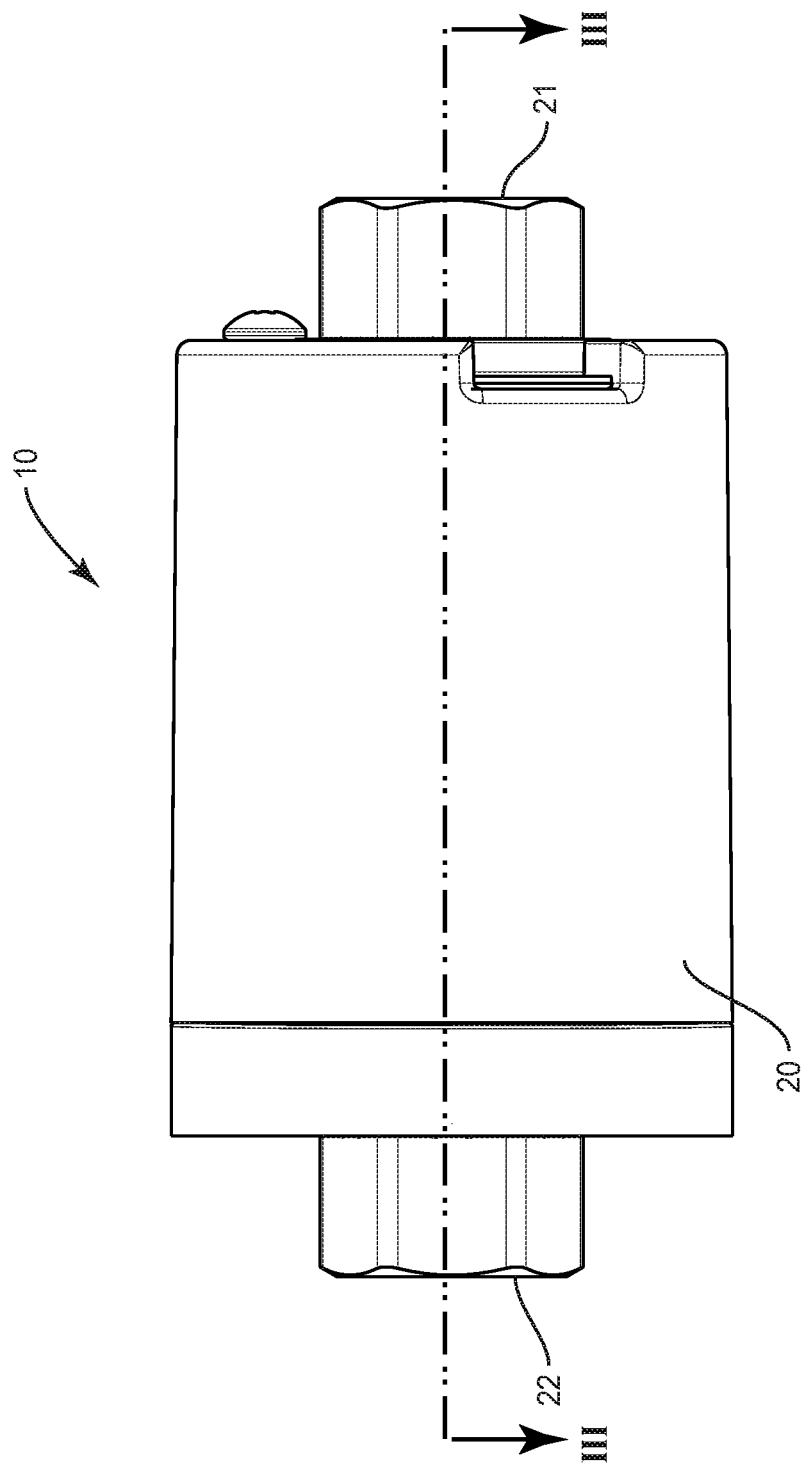
FIG. 2 is a side view of a counter.

As illustrated in FIG. 2, the counter 10 includes a compact shape and size to facilitate positioning within the tool. One or both of the inlet 21 and outlet 22 may be threaded to removably attach to the fluid line 100. The counter 10 may also be equipped for attachment to the fluid line 100 through mechanical fasteners, adhesives, and various other known manners. The counter 10 may alternatively be integrally formed with the fluid line 100 during manufacturing process for new tool designs.

Figure 3:
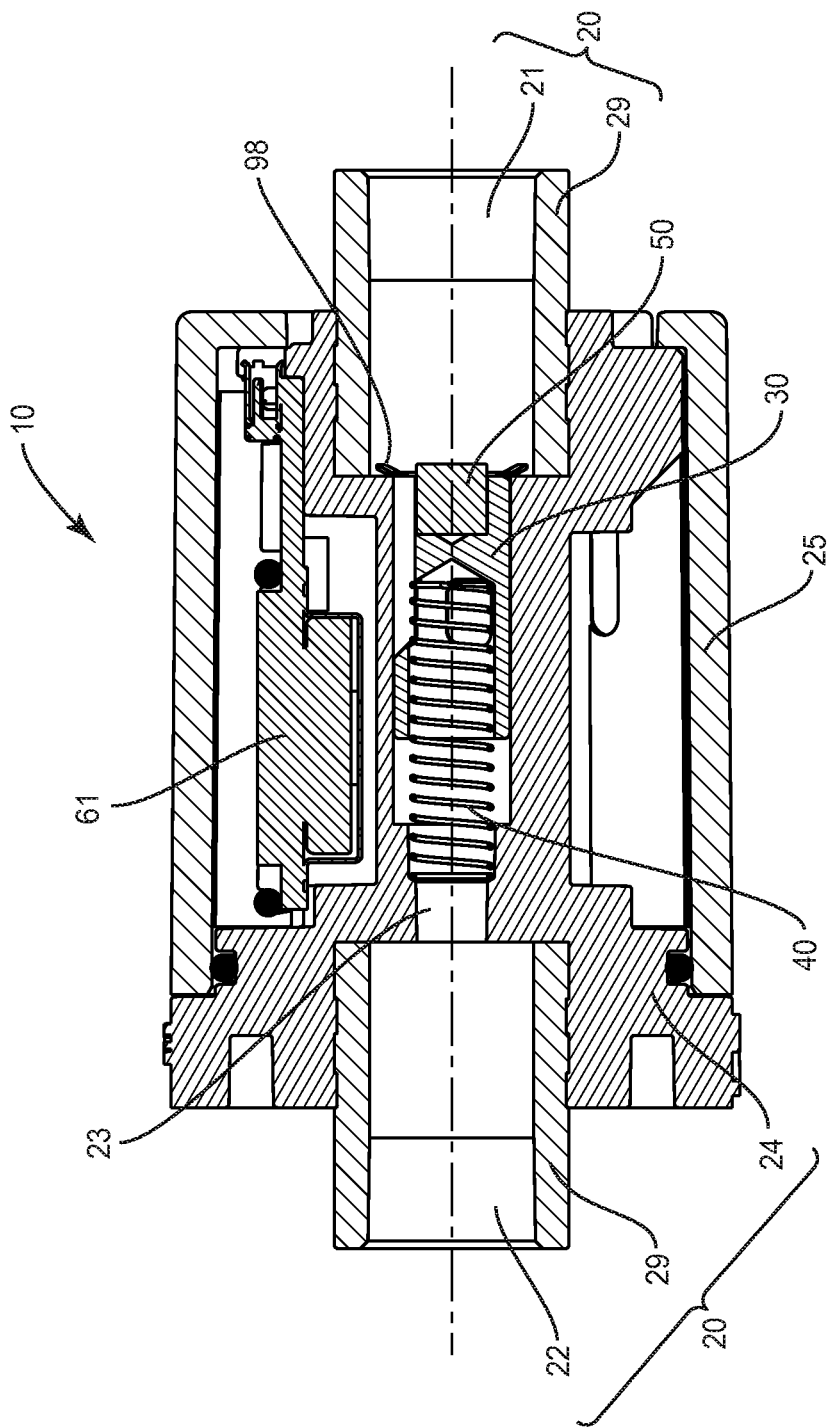
FIG. 3 is a sectional view of the counter of FIG. 2 cut along line III-III.
Figure 4:
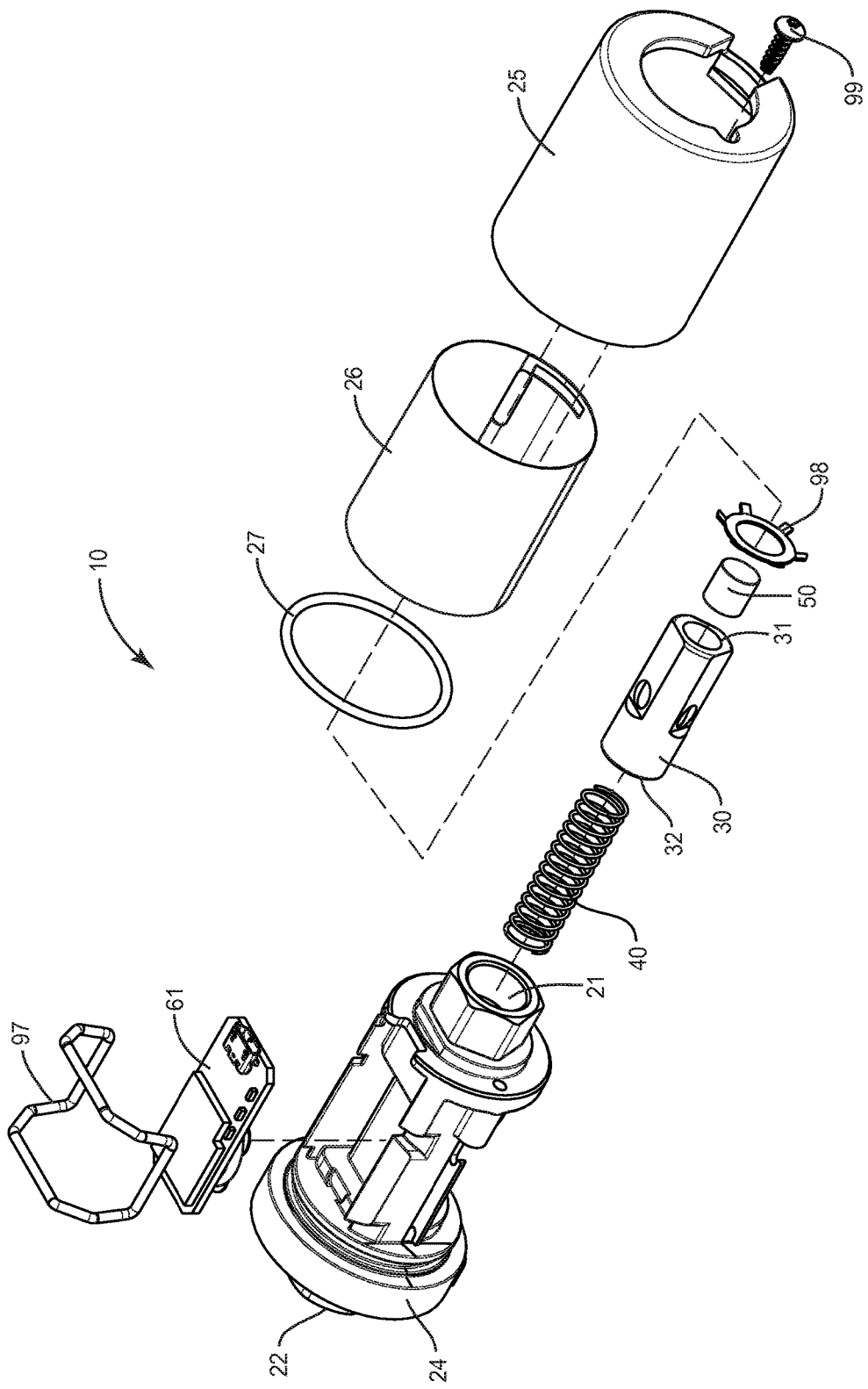
FIG. 4 is an exploded view of the counter of FIGS. 2 and 3.

FIGS. 3 and 4 illustrate the counter 10. The counter 10 includes the body 20 that includes a base 24 with the inlet 21, outlet 22, and passage 23. One or both of the inlet 21 and outlet 22 may include sleeves 29. The passage 23 may take any suitable lengths and cross-sectional shapes and sizes. In one embodiment, the passage 23 is straight. The diameter of the passage 23 may be constant along the length, or may vary. A cover 25 may extend around at least a portion of the base 24. In one embodiment, the cover 25 has a cylindrical shape with an open interior sized to receive the base 24. One or more fasteners 99 may attach the cover 25 to the base 24 and/or the cover 25 may be configured to attach to the base 24 without the need for fasteners. A sleeve 26 and o-ring 27 may be sized to fit within the cover 25. In some embodiments, the sleeve 26 may be used to provide information about the counter 10.

A piston 30 is movably located in the passage 23. The piston 30 includes an elongated shape with a first end 31 and a second end 32. The piston 30 may also include a hollow interior. In one embodiment, the piston 30 includes a circular cross-sectional shape, although the piston 30 may include other shapes. The piston 30 is sized smaller than the passage 23 to provide for it to move along the passage 23. In one embodiment, the piston 30 is constructed from a non-magnetic material. Examples include but are not limited to plastic, rubber, non-magnetic metals (including alloys) such as aluminum or magnesium.

A biasing member 40 contacts against the piston 30 and biases it along the passage 23 towards the inlet 21. The biasing member 40 may include various structures, including but not limited to a spring and a foam material. In one embodiment, the biasing member 40 contacts against the second end 32 of the piston 30 to bias the piston 30 along the passage 23. The passage 23 may be shaped to prevent escape of the piston 30 and/or control an extent of movement along the passage 23. In one embodiment, a retaining ring 98 is mounted to the body 20 and extends into the passage 23 to act as a stope to control an extent of upstream movement of the piston 30.

A sensor target 50 is disposed on the piston 30 and moves along the passage 23 with the piston 30. The sensor target 50 may advantageously be a magnet, but may take other forms suitable for non-contact proximity sensing. The sensor target 50 is smaller than the piston 30 and extends along a limited length of the piston 30. In one embodiment, the sensor target 50 is attached to the piston 30 at the first end 31. In one specific embodiment, the sensor target 50 fits within a cavity formed in the first end 31. The sensor target 50 may also be positioned at different locations along the piston 30, such as along a central portion between the ends 31, 32.

A controller 60 oversees the operation of the counter 10. The controller 60 is mounted on a circuit board 61 that is attached to the body 20 by a clip 97. The circuit board 61 fits within a space formed between the body 20 and the cover 25. This positioning protects the circuit board 61 and the attached components. This positioning also advantageously helps ensure no physical contact between the circuit board 61 and the fluid operating the tool.

Figure 5:
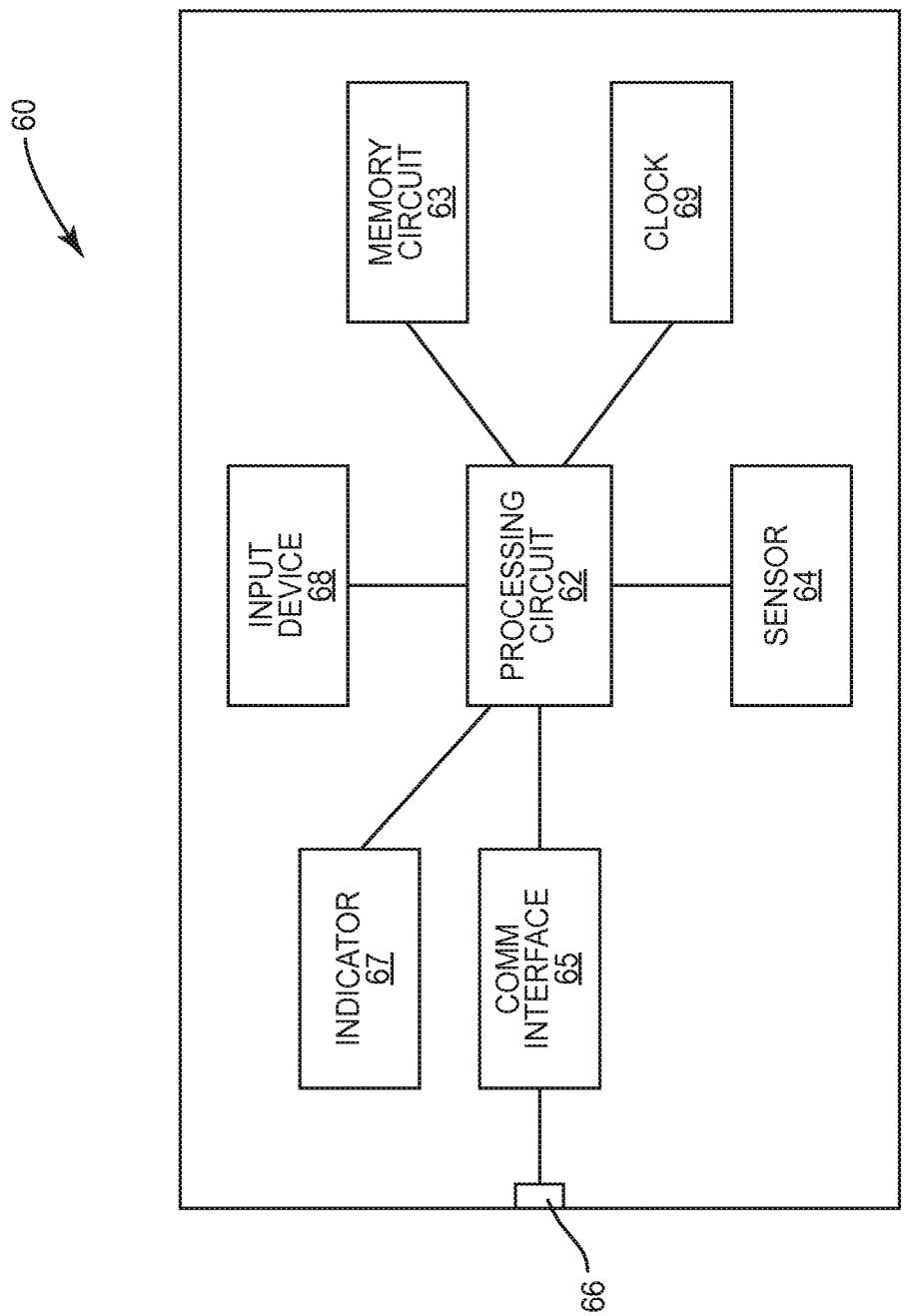
FIG. 5 is a schematic diagram of a controller with a counter.

As illustrated in FIG. 5, the controller 60 includes a processing circuit 62 that may include one or more microprocessors, microcontrollers, ASICs, or other programmable devices configured with appropriate software and/or firmware to control the overall operation of the counter 10 according to program instructions stored in a memory circuit 63. The memory circuit 63 stores processing logic, programming code, and operational information for use by the processing circuit 62. The memory circuit 63 may include both volatile and non-volatile memory, for example. A sensor 64 is configured to determine the movement of the sensor target 50 along the passage 23. A communication interface 65 may comprise a short-range wireless interface, such as a BLUETOOTH interface, USB, RFID, ZIGBEE, or WIFI interface, a long range cellular phone or satellite communications interface, or a wired interface, such as a serial, USB, micro USB, FIREWIRE, Lightning, or Thunderbolt interface. There may be more than one communications interface 65. An antenna (not illustrated) may be configured for transmitting and receiving wireless signals to and from remote sources. The communication interface 65 may further include an I/O port 66 for wired communication connection with the remote controller(s). In one embodiment, the port 66 is a micro USB port.

A clock 69 may be configured to measure operational time of the counter 10 and/or tool, as well as various other time periods. The controller 60 may further include one or more indicators 67, such as light-emitting diodes (LEDs) or LCD displays, for indicating various data items to a user. For example, the indicator 67 could be used to indicate the operational life remaining for the tool, the number of operational cycles performed by the tool, etc. An input device 68 such as a keypad, touchpad, switch, dial, buttons, track-ball, etc. may be included to receive inputs from a tool operator. The controller 60 may include a separate power source such as a battery (not illustrated) for powering one or more of the various components. Alternatively, the controller 60 may receive power from the tool.

In one embodiment, the sensor 64 is a proximity sensor that is in spaced relation to the piston 30, and advantageously external to the passage 23. In one embodiment, the sensor 64 is an magnetic and/or electromagnetic sensor, such as a reed switch, hall effect switch, or the like. In some embodiments, the sensor 64 may be of a type used for capacitive proximity sensing and/or inductive proximity sensing. The details of such sensors 64 being well known in the field of proximity sensing, they will not be discussed in detail herein in the interests of brevity. The sensor 64 is longitudinally forwardly offset from the sensor target 50 when the counter 10 is in its unactuated orientation.

Figure 6A:
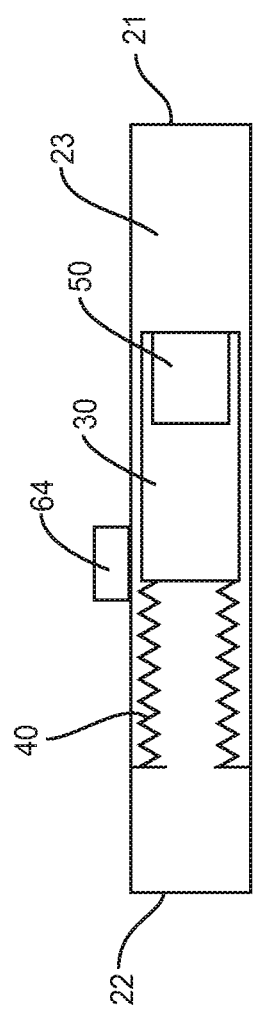
FIG. 6A is a schematic diagram of a counter in an unactuated orientation.
Figure 6B:
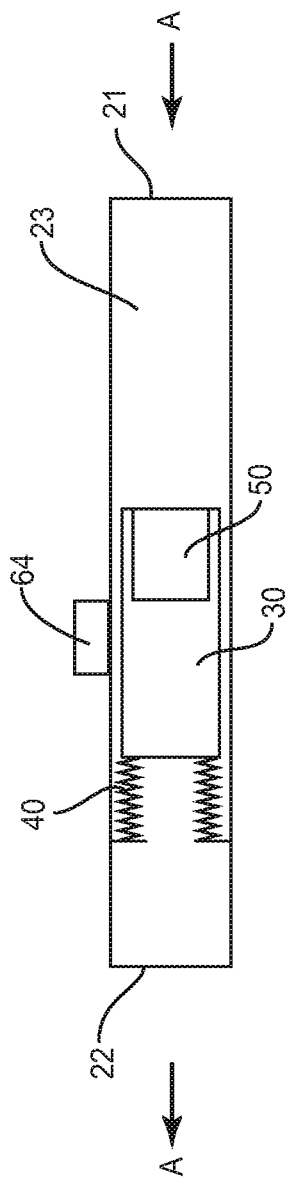
FIG. 6B is a schematic diagram of a counter in an actuated orientation.

FIGS. 6A and 6B schematically illustrate the operation of the counter 10. The sensor 64 is positioned at a location to sense the sensor target 50. In one embodiment, the sensor 64 is positioned in proximity to the passage 23, but not within the passage 23. The piston 30 and sensor target 50 are positioned in the passage 23 and biased towards the inlet 21 by the biasing member 40. As illustrated in FIG. 6A, the counter 10 is in an unactuated orientation when the sensor target 50 is positioned a distance away from the sensor 64. The unactuated orientation occurs when the tool is not being operated; thus, no fluid is moving along the fluid line in the unactuated orientation.

During tool use, fluid moves through the passage 23 in the direction of arrows A as illustrated in FIG. 6B. As fluid moves along the passage 23, the force from the fluid pushes on the piston 30 that carries the sensor target 50, moving the piston 30 along the passage 23 and towards the outlet 22. This movement causes the sensor target 50 to become longitudinally aligned with the sensor 64 sufficiently to "trip" the sensor 64. For ease of reference, this configuration is called the actuated orientation. The activation of the sensor 64 wakes up the processing circuit 62, which performs a counting routine and/or timing routine, and stores relevant values/parameters in the memory circuit 63. The amount and/or rate of fluid is adequate to move the piston 30 and sensor target 50 to the actuated orientation. Note that the processing circuit 62 and/or other suitable electronics may advantageously be configured to go to sleep (e.g., go to a low power state) in response to the counter 10 being in the unactuated orientation for a predetermined period of time, in order to conserve power.

The sensor 64 will remain tripped during tool usage as the fluid flow keeps the piston 30 and sensor target 50 in proximity to the sensor 64. Once the tool operation is complete, fluid flow along the passage 23 is stopped resulting in the piston 30 and sensor target 50 moving away from the sensor 64 to the unactuated orientation. The amount of tool usage may be based on various aspects determined through the sensor 64. This may include the number of times the sensor 64 is tripped and/or the total amount of time that the counter 10 is in the actuated orientation. The tool usage is monitored by the processing circuit 62. This usage data may then be transmitted to a remote source as necessary. The transmissions may occur on one or more of a regular basis, upon receipt of a tool usage request from the remote source, and upon tool usage meeting one or more thresholds.

The sensor 64 is configured to sense the sensor target 50 when the sensor target is in a second position along the passage 23. The sensor 64 may be configured to not detect the sensor target 50 when in the first position, or to differentiate the position of the sensor target 50 between the first and second positions.

Based on programming stored in the memory circuit 63, the user can enter a time value that would indicate what they consider to be a true cycle of the tool. For example, user XYZ has a pneumatic tool that has a cycle time of five seconds. The user would program slightly less than five seconds into the software program along with other data indicating use rates for the tool. For example, the user could enter a "warning" threshold of X cycles and Y cycles for a "stop" threshold. The user would program a desired value for X as a "warning" threshold value and Y as the "stop" threshold. Once the counter 10 has reached a true cycle count of X, the controller 60 would provide a first indication and when the counter 10 has reached a true cycle count of Y, the controller 10 would provide a second indication. Typically this would indicate that the tool is ready for calibration or some other type of preventative maintenance but could also be used for a variety of other actions depending on the user. The user then has the ability to zero out the count to begin the process over again. Of course, the count may be used for other purposes, such as productivity reporting and the like.

In one embodiment, the controller 60 is further programmed to indicate the state of the tool using the indicators 67. Different color/number/sequences of indicators 67 may be used to indicate the various operational stages of the tool. For example, differently colored indicators 67, such as green, yellow, and red LED are operatively connected to the processing circuit 62, and disposed so as to be visible external to the housing so that the user may view them. A "warning" threshold of X cycles could result in activation of a yellow LED light and Y cycles results in activation of a red LED light or a "stop" threshold. Once the counter 10 has reached a true cycle count of X, the LED light changes from green to yellow and when the counter has reached a true cycle count of Y, the LED light changes from yellow to red.

It should be noted that the various electronics, and particularly the processing circuitry, may advantageously have a sleep mode to conserve power. The electronics may be awakened from the sleep mode by the "tripping" of the sensor 64 due to the movement of the sensor target 50, as discussed above.

Further, it should be noted that the discussion above has generally been in the context of the counter 10 being an add-on module disposed on the inlet side of the relevant tool. However, such is not required. Indeed, the counter 10 may be disposed on the exhaust side of the tool and/or may be integrated into the tool, as is desired.

FIG. 5 includes an embodiment in which the various components are mounted as a single unit on the circuit board 61. Other embodiments may include the various components being dispersed in various parts as is desired.

Spatially relative terms such as "under", "below", "lower", "over", "upper", and the like, are used for ease of description to explain the positioning of one element relative to a second element. These terms are intended to encompass different orientations of the device in addition to different orientations than those depicted in the figures. Further, terms such as "first", "second", and the like, are also used to describe various elements, regions, sections, etc. and are also not intended to be limiting. Like terms refer to like elements throughout the description.

As used herein, the terms "having", "containing", "including", "comprising" and the like are open ended terms that indicate the presence of stated elements or features, but do not preclude additional elements or features. The articles "a", "an" and "the" are intended to include the plural as well as the singular, unless the context clearly indicates otherwise.

The present invention may be carried out in other specific ways than those herein set forth without departing from the scope and essential characteristics of the invention. The present embodiments are, therefore, to be considered in all respects as illustrative and not restrictive, and all changes coming within the meaning and equivalency range of the appended claims are intended to be embraced therein.

What is claimed is:

1. A counter for a fluid-powered tool that includes fluid that moves along a fluid line when the tool is in operation, the counter comprising:
    a body with a fluid passage comprising an inlet and an outlet that is configured for the fluid to move through the passage from the inlet to the outlet when the tool is in operation;
    a piston with a first end and a second end, the piston positioned within the passage between the inlet and the outlet, the piston comprising a smaller cross-sectional size than the passage to be movable along the passage;
    a sensor target attached to the piston and positioned within the passage, the sensor target sized to be movable along the passage with the piston;
    a non-contact proximity sensor configured to detect when the sensor target is in a predetermined range of the sensor along the passage;
    a processing circuit configured to monitor when the sensor detects the sensor target within the predetermined range of the sensor; the processing circuit configured to at least one of:
        determine an amount of usage of the fluid-powered tool based on a count of a number of times that the sensor detects that the sensor target is with the predetermined range of the sensor, wherein the count is greater than one; and
        determine the amount of usage of the fluid-powered tool based on an amount of time that the sensor detects the sensor target is with the predetermined range of the sensor, wherein the amount of time is from each of at least two distinct time intervals that are non-contiguous in time; and
    a biasing member that applies a first force to the piston to bias the sensor target away from the predetermined range,
    the first force of the biasing member positioning the sensor target away from the predetermined range when the tool is not in operation;
    the first force being less than a force applied by the fluid moving, along the fluid line when the fluid-powered tool is in operation with the sensor target being positioned in the predetermined range.

2. The counter of claim 1, wherein the processing circuit is configured to determine the amount of usage of the fluid-powered tool based on the count of the number of times that the sensor detects that the sensor target is with the predetermined range of the sensor, wherein the count is greater than one.

3. The counter of claim 1, wherein the processing circuit is configured to determine the amount of usage of the fluid-powered tool based on the amount of time that the sensor detects the sensor target is with the predetermined range of the sensor, wherein the amount of time is from each of the at least two distinct time intervals that are non-contiguous in time.

4. The counter of claim 1, wherein the biasing member is positioned within the passage.

5. The counter of claim 1, further comprising a stop positioned along the passage between the inlet and the predetermined range of the sensor, the stop extending into the passage to limit an, extent of movement of the piston upstream from the predetermined range.

6. The counter of claim 1, wherein the biasing member biases the piston in a direction upstream from the predetermined range of the sensor.

7. The counter of claim 1, wherein the sensor target is a magnet; and wherein the piston is non-magnetic and includes a greater length measured along the passage than the sensor target.

8. A counter for a fluid-powered tool that includes fluid that moves along a fluid line when the tool is in operation, the counter comprising:
    a body with a fluid passage comprising an inlet and an outlet that is configured for the fluid to move through the passage from the inlet to the outlet when the fluid-powered tool is in operation;
    a piston movably positioned within the passage between the inlet and the outlet;
    a sensor target attached to the piston;

a non-contact proximity sensor configured to detect when the sensor target is within a predetermined range along the passage;

a processing circuit configured to at least one of:
  determine an amount of usage of the fluid-powered tool based on a count of a number of times that the sensor detects that the sensor target is with the predetermined range of the sensor, wherein the count is greater than one, and
  determine the amount of usage of the fluid-powered tool based on an amount of time that the sensor detects the sensor target is with the predetermined range of the sensor, wherein the amount of time is from each of at least two distinct time intervals that are non-contiguous in time.

9. The counter of claim 8, further comprising a biasing member positioned in the passage that applies a first force to the piston to bias the sensor target away from the predetermined range.

10. The counter of claim 8, wherein the processing circuit is configured to determine the amount of usage of the fluid-powered tool based on the count of the number of times that the sensor detects that the sensor target is with the predetermined range of the sensor, wherein the count is greater than one.

11. The counter of claim 8, wherein the processing circuit is configured to determine the amount of usage of the fluid-powered tool based on the amount of time that the sensor detects the sensor target is with the predetermined range of the sensor, wherein the amount of time is from each of the at least two distinct time intervals that are non-contiguous in time.

12. The counter of claim 8, further comprising a stop positioned along the passage between the inlet and the predetermined range of the sensor, the stop extending into the passage to limit an extent of movement of the piston upstream from the predetermined range.

13. The counter of claim 8, wherein the sensor target is a magnet; and wherein the piston is non-magnetic and includes a greater length measured along the passage than the sensor target.

* * * * *